United States Patent Office 3,350,270
Patented Oct. 31, 1967

3,350,270
ALUMINUM ASPIRIN FILM-ENVELOPED THERAPEUTIC AGENTS IN SUSTAINED RELEASE DOSAGE FORM
William E. Gaunt, Hackensack, N.J., assignor to Leeds-Dixon Laboratories, Inc., Moonachie, N.J., a corporation of New Jersey
No Drawing. Filed Sept. 18, 1964, Ser. No. 397,607
21 Claims. (Cl. 167—82)

This invention relates to therapeutic products in sustained release dosage form and to their preparation, and more especially to sustained release dosage forms containing a very high amount or concentration of a water-insoluble therapeutically active agent while at the same time obtaining a preselected desired release pattern.

Sustained release products are comparatively widely known today and have certain desirable characteristics in that a multiple dosage can be administered initially which will produce an effective blood level of the therapeutic agent over a prolonged period of time and in such a manner that the therapeutic agent is released incrementally and with considerable uniformity. Methods for making sustained release products already known, however, are subject to the disadvantage that for the most part they can only incorporate relatively small amounts of active ingredient and so are not applicable to quite a large number of important drugs. There are various therapeutic agents which, for best results, should be administered in relatively large amounts. Examples are aspirin, where it is desired to administer rather massive doses for the treatment of rheumatoid arthritis, and the like. Another example is meprobamate, where the minimum effective tranquilizing dose is 400 milligrams per tablet, and an effective sustained release dosage form would need to contain at least 800 milligrams of meprobamate.

In such an instance it will be appreciated that the size of the dose itself establishes certain limits on the processing which can be applied in controlling the release of medicaments, and that it is only too likely that the dosage form will be too large for convenient swallowing and, hence, is apt to be impracticable. With high dosages of active therapeutic agents of the order of several hundred milligrams, there is very little room that can be allotted in the dosage form to the materials used to control the release of the medicament. This problem is accentuated by the very insolubility of the drug itself and in many forms of processing the drug will be so tightly bound or protected that it is not available in the alimentary tract after ingestion and, hence, the dosage form is ineffective since it is unable to produce the required therapeutically effective blood level in the patient.

An additional problem has been encountered in the production of adequate sustained release dosage forms of water-insoluble drugs used in high dosages in that a balance has to be reached between the amount of non-sustained drug which is used to create the effective blood level and the amount and rate of release of the sustained drug being that necessary to compensate for the rate at which the drug is being metabolized and/or excreted.

One unexpected feature encountered in the preparation of sustained release dosage forms of high dosage-water insoluble drugs is that the rate of release of the drug from the dosage form, when tested by the customary in vitro procedure, needs to be appreciably faster than is generally considered appropriate by those skilled in the art. It is generally considered that for effective in vivo control by a sustained release dosage form, in vitro evaluation should indicate a continuous release over eight to twelve hours. I have found that this is not the case with high dosage-water insoluble drugs; effective in vivo blood levels extending for a twelve hour period are obtained when on in vitro testing the sustained dosage form releases all of its therapeutic material in approximately 5 hours. Such products having in vitro release extending to the eight to twelve hour period, when ingested do not provide effective blood levels for their release of therapeutic material in the body is too slow.

Altogether the production of effective sustained release dosage form of high-dose-water insoluble drugs is fraught with difficulties. The dose required is so high that only relatively small amounts of the sustaining material can be used, if the dosage form is to be practical and capable of being ingested. However, the sustaining material must be such that the restraint on solubility it imposes must be controllable and must not extend in vitro beyond about 5 hours.

I have found that this delicate balance can be achieved by taking advantage of some unexpected properties of aluminum aspirin.

Aluminum aspirin is a well known compound. It has in fact been officially accepted into the National Formulary as a common therapeutic material. The Eleventh Edition of the National Formulary published in 1960 carries a monograph on aluminum acetyl salicylate. Under the heading of "solubility" the monograph states that "aluminum acetyl salicylate is insoluble in water and organic solvents."

Being one skilled in the pharmaceutical art and inclined to credit such a statement in an official compendium, I did not expect to find that in fact aluminum acetyl salicylate is soluble in some organic solvents, for example, methylene chloride and chloroform. The rate of dissolution is quite slow, and since such an event would be quite unexpected, a skilled observer conducting such a test for solubility would conclude the aluminum acetyl salicylate was indeed insoluble in said solvents and would not have discovered the gradual dissolution of the aluminum aspirin in chloroform or methylene chloride into the ultimate development of a clear somewhat viscous solution. I have dissolved as much as 60 grams of aluminum aspirin in 100 ml. of methylene chloride.

Normally when a solution of a simple chemical substance is concentrated down the chemical substance crystallizes out as the solvent disappears to a volume below that which can hold all of the claimed substance. On evaporation of the chloroform or methylene chloride solution of aluminum aspirin, however, the aluminum aspirin does not crystallize out; it stays in solution during such evaporation and is left as a brilliant, shining, glistening continuous film on the surface of the vessel in which the solution had been. This continuous film is insoluble in water just as the aluminum aspirin originally used had been water insoluble. The aluminum aspirin film is quite brittle. The unexpected solvent solubility and film forming characteristics of aluminum acetyl salicylate are the basis for the present invention in making sustained release dosage forms of high dose-water insoluble therapeutic materials.

Advantage has also been taken of the fact that the properties of the aluminum aspirin film can be modified by incorporation into the solvent solution of aluminum aspirin of film-forming polymers such as polyvinyl pyrrolidone, polyvinyl alcohol, carboxy polymethylene, ethyl cellulose, methyl cellulose, hydroxyl ethyl cellulose, polyvinyl acetate, etc. Using such polymers in making films of aluminum aspirin, modify its water solubility characteristics and render them more continuous and less brittle.

It has also been found possible to modify the characteristics of the aluminum aspirin film by incorporating into them small amounts of surface active agents such as polyoxy ethylene sorbitol mono-oleate and dioctyl sodium sulfosuccinate, etc.

The deposition into the surface of a therapeutic material of a film of aluminum aspirin, by dissolving the aluminum aspirin in a suitable solvent, adding to this solution the therapeutic material, and evaporating the solvent markedly alters the rate at which the therapeutic material goes into aqueous solution. This influence of the aluminum aspirin film can be modified quite readily by incorporating into the aluminum aspirin solvent solution either a solvent soluble film forming polymer or a solvent soluble surface active agent or both.

To an extent which is of practical value, the solubility controlling properties of an aluminum aspirin film applied to the surface of a therapeutic material can be obtained by the simple admixture of the therapeutic material and aluminum aspirin followed by compression into tablet form if the particles of therapeutic material are sufficiently large (60–80 mesh) and the particles of aluminum aspirin are sufficiently small (200 mesh or finer). Such simple admixture and compression does not permit the greater flexibility of control exercisable by modifying the aluminum aspirin into a polymer film and/or a solvent soluble surface active agent. However, it has been found valuable in the case of a sustained release dosage form of aspirin in virtue of the high degree of chemical stability which such a dosage form possesses. It is well known that the aspirin molecule is highly susceptible and has to be handled with care if decomposition into salicylic acid and acetic acid is to be avoided. Granulation of aspirin with granulating agents in aqueous or volatile solvents can frequently create conditions which deleteriously affect the stability of the aspirin and if they can be avoided, it is the common practice in the art to do so.

By taking advantage of the unique characteristics of aluminum aspirin it has been found possible to make a stable sustained release aspirin tablet, with the additional uniqueness that part of the therapeutic content of the tablet is contributed by the material used in effecting the sustained release property.

The processing described in this application has been found applicable without, however, being limited thereto, to the preparation of therapeutic agents such as aspirin, meprobamate, nicotinic acid, phenacetin, acetaminophenol, the sulfa drugs, aluminum hydroxide and other water insoluble antacids, tetracycline and the water insoluble penicillin salts, all being drugs required in high doses. It is also applicable to combination of drugs such as, for example, meprobamate with pentaerythritol tetranitrate.

Sustained release tablets containing as much as 800 mg. of therapeutic agent, but still being readily swallowed have been made and others containing over 90% of therapeutic material available to the body at a controlled rate have also been prepared.

The following demonstrates that aluminum aspirin can be dissolved and has film-forming characteristics.

Ten grams of aluminum acetyl salicylate (aluminum aspirin) is added to 100 ml. of methylene chloride. A white opaque suspension is formed. After several minutes and with occasional stirring, the opacity of the liquid begins to lessen and after about 15 minutes, all of the aluminum aspirin is in solution.

The solution is poured into a shallow dish and the solvent permitted to evaporate. The aluminum aspirin remains at the bottom of the dish as a smooth, brilliant film, which is however somewhat readily broken.

The invention is illustrated by the following non-limitative examples.

Example 1

Fifteen grams of aluminum aspirin is dissolved in 150 ml. of methylene chloride. This solution is added to 415 grams of acetyl salicylic acid, the whole being mixed to a smooth cream. The solvent is removed by air drying and the resulting drug mass screened through a 20 mesh sieve to provide a uniform granulation. After adding 2% of powdered hydrogenated vegetable oils as a lubricant, the granulation is compressed into a tablet having sustained release characteristics but containing 98% of the therapeutically active component.

On exposure to simulated gastric fluids for 1 hour and thereafter to simulated intestinal fluids using the U.S.P. tablet disintegration equipment, this preparation gave the following release data.

| Nature of Exposure | Total Time | Cumulative, Percent Release |
|---|---|---|
| Gastric for 1 hour | 1 | 22 |
| Intestinal for 1 hour | 2 | 55 |
| Intestinal for 2 hours | 3 | 73 |
| Intestinal for 3 hours | 4 | 82 |
| Intestinal for 4 hours | 5 | 95 |

Example 2

Thirty grams of aluminum aspirin and 30 grams of polyvinyl pyrrolidone are dissolved in 300 milliliters of methylene chloride. This solution is added to 300 grams of powdered aspirin and the whole mixed to a smooth, cream-like consistency. The solvent is then removed by evaporation and the dried mass is broken into granules to which magnesium stearate and talc were added for lubrication during subsequent compression of the powdered mixture into tablets, each of which contains 87.5 percent of therapeutic material which dissolved slowly upon exposure to artificial gastric and intestinal fluids as follows:

| Nature of Exposure | Total Time | Cumulative, Percent Release |
|---|---|---|
| One hour (artificial gastric fluid) | 1 | 21.8 |
| Two hours (artificial intestinal fluid) | 3 | 50.0 |
| Four hours (artificial intestinal fluid) | 5 | 69.2 |

Example 3

When 40 grams of aluminum aspirin and 20 grams of polyvinyl pyrrolidone were used as in the above example, the rate of solubilization was decreased.

Example 4

When 20 grams of aluminum aspirin and 40 grams of polyvinyl pyrrolidone were used as in Example 1, the rate of solubilization was increased.

The influence of varying the relative amounts is illustrated as follows:

| | Tablet Composition (mg.) | |
|---|---|---|
| | No. 1 | No. 2 |
| Aspirin | 300 | 300 |
| Aluminum aspirin | 40 | 20 |
| Polyvinyl pyrrolidone | 20 | 40 |
| | Cumulative, Percent Release | |
| Time of Exposure: | | |
| One hour (artificial gastric fluid) | 13.5 | 17.5 |
| Two hours (artificial intestinal fluid) | 49.6 | 64.7 |
| Four hours (artificial intestinal fluid) | 64.4 | 77.6 |

Example 5

A solution of 20 grams of polyvinyl pyrrolidone and 15 grams of aluminum aspirin dissolved in 150 milliliters of methylene chloride were added to 415 grams of powdered aspirin under stirring until a smooth, uniform mixture was obtained, and this mixture was stirred constantly while evaporating the solvent therefrom in a stream of air. This was continued until the product broke up into lumps. Residual solvent was removed by warming to 40° C. and the dried mass was then reduced to granules. Magnesium stearate and talc were added as lubricants, and the mass then was compressed into tablets containing over 90 per cent of active ingredient. The solubility rate of this formulation is as follows:

| Nature of Exposure | Total Time | Cumulative, Percent Release |
|---|---|---|
| One hour (artificial gastric fluid) | 1 | 17.5 |
| Two hours (artificial intestinal fluid) | 3 | 58.5 |
| Four hours (artificial intestinal fluid) | 5 | 90.3 |

*Example 6*

When the foregoing procedure was repeated using 300 grams of aluminum aspirin, 400 grams of polyvinyl pyrrolidone and 8.3 kilograms of powdered aspirin and compressed into tablets with the usual lubricants, the following data were obtained:

| Nature of Exposure | Total Time | Cumulative, Percent Release |
|---|---|---|
| One hour (artificial gastric fluid) | 1 | 18 |
| Two hours (artificial intestinal fluid) | 3 | 66 |
| Four hours (artificial intestinal fluid) | 5 | 94 |

*Example 7*

A portion of the above granulation was compressed at a weight containing 430 mg. of aspirin as one layer of a two-layer tablet using the regular 10 percent starch aspirin granulation at a weight providing 216 milligrams of aspirin as the other layer. The tablet contained approximately 90 percent of therapeutically active material and had the following release characteristics:

| Nature of Exposure | Total Time | Cumulative, Percent Release |
|---|---|---|
| .25 hour (artificial gastric fluid) | 0.25 | 35.5 |
| 1 hour (artificial gastric fluid) | 1 | 50.5 |
| 2 hours (artificial intestinal fluid) | 3 | 79.8 |
| 4 hours (artificial intestinal fluid) | 5 | 95.8 |

*Example 8*

To 415 grams of aspirin crystals of 60–80 mesh are added 25 grams of aluminum aspirin which had been screened through a 200 mesh sieve. After these materials had been thoroughly blended, 10 grams of hydrogenated vegetable oils was added as a lubricant and the mix compressed into tablets.

These tablets exhibited the following release characteristics:

| Nature of Exposure | Total Time | Cumulative, Percent Release |
|---|---|---|
| Gastric for 1 hour | 1 | 20 |
| Intestinal for 1 hour | 2 | 48 |
| Intestinal for 2 hours | 3 | 69 |
| Intestinal for 3 hours | 4 | 83 |
| Intestinal for 4 hours | 5 | 93 |

*Example 9*

A portion of the above granulation was compressed as a two-layer tablet using a weight of granulation containing 430 mg. of aspirin as one layer and a weight of the normal 10 percent starch-aspirin granulation containing 215 mg. of aspirin as the other layer. These tablets, containing 10 grains of aspirin had the following release characteristics:

| Nature of Exposure | Total Time | Cumulative, Percent Release |
|---|---|---|
| 1 hour gastric | 1 | 47 |
| 1 hour intestinal | 2 | 65 |
| 2 hour intestinal | 3 | 79 |
| 3 hour intestinal | 4 | 88 |
| 4 hour intestinal | 5 | 94 |

Tablets made by this procedure have shown no increase in free salicyclic acid content when stored at room temperature for almost 2 years.

*Example 10*

(A) 500 grams of meprobamate and 15 grams of aluminum aspirin were intimately blended. 30 grams of polyvinyl pyrrolidone and 5 grams of Aerosol OT were dissolved in 400 milliliters of methylene chloride. This solution was added to the blend of meprobamate and aluminum aspirin and the mixture stirred until it was in homogeneous cream form. The solvent was removed by evaporation and the dried mass was reduced to 20 mesh granules. The granules were lubricated with 2 percent silica gel, 1 percent magnesium stearate and 2 percent stearic acid.

(B) 300 grams of meprobamate and 30 grams of corn starch were blended and granulated by conventional granulation procedures with a mixture of 12 percent of starch paste and 4 percent of gelatin in water. The granulation was dried, screened to 20 mesh and lubricated with 1 percent magnesium stearate, 1 percent of stearic acid and 2 percent of silica gel.

Two-layer tablets were formed by compression using 580 milligrams of granulation (A) and 360 milligrams of granulation (B), the total tablet weight being 940 milligrams, of which the meprobamate constituted 800 milligrams or approximately 84 percent.

Upon exposure to simulated gastric fluid for one hour and simulated intestinal fluid for four additional hours, the following release data were obtained on the above-produced sustained release meprobamate tablets:

| Nature of Exposure | Total Time | Cumulative, Percent Release |
|---|---|---|
| Gastric for 1 hour | 1 | 47.5 |
| Intestinal for 1 hour | 2 | 63.5 |
| Intestinal for 2 hours | 3 | 75.0 |
| Intestinal for 3 hours | 4 | 87.0 |
| Intestinal for 4 hours | 5 | 100.0 |

*Example 11*

330 grams of nicotinic acid, 30 grams of aluminum aspirin and 60 grams of polyvinyl pyrrolidone were thoroughly blended together. 300 milliliters of methylene chloride were added to the powder blend and the whole mixed to a homogenous smooth cream. The solvent was removed by evaporation and the dried mass was reduced to 20 mesh granules. The granules were lubricated with 4 percent of silica gel and 1 percent of magnesium stearate and then compressed into tablets, each of which contained 330 milligrams of nicotinic acid.

The tablets were exposed to simulated gastric fluid for one hour and then to simulated intestinal fluid for six additional hours. The following release data were obtained:

| Nature of Exposure | Total Time | Cumulative, Percent Release |
|---|---|---|
| 1 hour gastric | 1 | 33 |
| 2 hours intestinal | 3 | 62 |
| 4 hours intestinal | 5 | 68 |
| 6 hours intestinal | 7 | 73 |

Example 12

(A) 400 grams of meprobamate, 300 grams of a 1:5 dilution of pentaerythritol tetranitrate on lactose and 30 grams of aluminum aspirin were thoroughly blended. 30 grams of polyvinyl pyrrolidone and 5 grams of Aerosol ride. The solution was added to the blend and mixed to a smooth homogeneous cream. The solvent was removed by air drying and the dried mass was screened to 20 mesh granules which were lubricated with 2 percent of talc and 1 percent of magnesium stearate.

(B) by a conventional granulation procedure, a granulation was made by blending 200 grams of meprobamate with 100 grams of the 1:5 dilution of pentaerythritol tetranitrate on lactose and by granulating with a mixture of 12 percent starch paste and 4 percent gelatin in water. The resulting granulation was dried and screened to 20 mesh, lubricated with 2 percent of silica gel and 1 percent of magnesium stearate, 5 percent of corn starch being added as a distintegrant.

Two-layer tablets were made by compression using 757 milligrams of granulation (A) and 325 milligrams of granulation (B). The total tablet weight was 1082 milligrams, of which 680 milligrams was active ingredient.

Example 13

(A) A blend was prepared from 400 grams of meprobamate, 15 grams of aluminum aspirin and 60 grams of pentaerythritol tetranitrate. 30 grams of polyvinyl pyrrolidone and 5 grams of Aerosol OT were dissolved in 400 milliliters of methylene chloride. The solution was added to the blend and the whole was mixed to a smooth homogeneous cream. The solvent was removed by evaporation and the dried mass was reduced to 20 mesh granules which were lubricated with 2 percent of silica gel and 1 percent of magnesium stearate.

(B) A blend prepared from 200 grams of meprobamate and 100 grams of a 1:5 dilution of pentaerythritol tetranitrate on lactose was granulated with a mixture of 12 percent of starch paste and 4 percent of gelatin in water. The granulation was dried, screened to 20 mesh, lubricated with 1 percent of stearic acid and 1 percent of magnesium stearate and 3 percent of guar gum was added as a disintegrant.

Two-layer tablets were made by compression using 525 milligrams of granulation (A) and 350 milligrams of granulation (B) to give a total weight of 875 milligrams, of which 680 milligrams (over 75 percent) was active ingredient.

Upon exposure to simulated alimentary fluids the tablets had the following release characteristics:

| Nature of Exposure | Total Time | Meprobamate | Pentaerythritol Tetranitrate |
|---|---|---|---|
| 1 hr. gastric | 1 | 46 | 40 |
| 1 hr. intestinal | 2 | 63 | 48 |
| 2 hrs. intestinal | 3 | 70 | 66 |
| 3 hrs. intestinal | 4 | 86 | 84 |
| 4 hrs. intestinal | 5 | 100 | 100 |

What is claimed is:

1. A therapeutic composition in sustained release dosage form comprising a therapeutic agent enveloped in a film of the aluminum salt of aspirin and containing a total of at least 60 percent of therapeutic agent.

2. A composition according to claim 1 in which the film further contains a film-forming polymer selected from the group consisting of polyvinyl pyrrolidone, polyvinyl alcohol, polyvinyl acetate, carboxypolymethylene, methyl cellulose, ethyl cellulose and hydroxyethyl cellulose.

3. A composition according to claim 1 in which the therapeutic agent is aspirin and the aluminum salt of the therapeutic agent is aluminum aspirin.

4. A composition according to claim 2 in which the rate of release of the therapeutic agent is varied by altering the ratio between the therapeutic agent and the film-forming substance; the higher the amount of film-forming substance, the greater the release time.

5. A composition according to claim 1 in which the total amount of therapeutic agent is of the order of at least 600 milligrams of therapeutic agent.

6. A therapeutic composition in sustained release dosage form comprising acetyl salicylate enveloped in a film of aluminum acetyl salicylate and a film-forming polymer, said film being deposited on the therapeutic agent from a solution thereof in an organic solvent followed by evaporation of the solvent.

7. A composition according to claim 6 in which an additional therapeutic agent is incorporated.

8. A composition according to claim 7 in which the main therapeutic agent is aspirin, the film contains aluminum aspirin and the additional therapeutic agent is one having a different type of therapeutic activity.

9. A composition according to claim 2 in which is further incorporated a film-forming adjunct which is itself an aluminum salt.

10. A sustained release therapeutic composition in tablet form consisting essentially of a pharmaceutical carrier having incorporated therein at least one water-insoluble therapeutic agent amounting to not less than about 60 to 80 percent of the weight of the tablet and a film-forming aluminum aspirin compound enveloping the therapeutic agent, said at least one therapeutic agent being selected from the group consisting of meprobamate, aspirin, aluminum hydroxide and other water-insoluble antacids, a sulfa drug, nicotinic acid, phenacetin, acetaminophenol, a tetracycline and a water-insoluble penicillin salt.

11. A sustained release therapeutic composition in tablet form consisting essentially of a pharmaceutical carrier having incorporated therein a water-insoluble therapeutic agent amounting to at least about 60 to 80 percent of the weight of the tablet and a film-forming aluminum aspirin compound enveloping the therapeutic agent.

12. A sustained release therapeutic composition in tablet form consisting essentially of a pharmaceutical carrier having incorporated therein a water-insoluble therapeutic agent amounting to at least about 60 to 80 percent of the weight of the tablet and a film-forming aluminum aspirin compound enveloping the therapeutic agent, said film-forming aluminum aspirin compound being modified by a solvent-soluble water-soluble polymer selected from the group consisting of polyvinyl pyrrolidone, ethyl cellulose, carboxypolymethylene, polyvinyl alcohol and a surface active agent.

13. A sustained release therapeutic composition according to claim 1 in which the tablet is a two-layer tablet and in which part of the water-insoluble therapeutic agent is present in each tablet layer.

14. A sustained release therapeutic composition according to claim 5 in which the therapeutic agent is meprobamate.

15. A sustained release therapeutic composition according to claim 5 in which the therapeutic agent is nicotinic acid.

16. A sustained release therapeutic composition in the form of a two-layer tablet consisting essentially of a pharmaceutical carrier in which is incorporated not less than about 60 to 80 percent of at least one water-insoluble therapeutic agent selected from the group consisting of meprobamate, a sulfa drug, nicotinic acid, phenacetin, acetaminophenol, aluminum hydroxide and other water-insoluble antacids, a tetracycline and a water-insoluble penicillin salt, part of the therapeutic agent being present in each tablet, a film-forming aluminum aspirin compound enveloping said therapeutic agent and the film-forming compound being modified by a solvent-soluble water-soluble polymer selected from the group consisting of polyvinyl pyrrolidone, ethyl cellulose, carboxypolymethylene, polyvinyl alcohol and a surface active agent.

17. A sustained release therapeutic composition according to claim 16 in which each layer of the two-layer tablet contains meprobamate and pentaerythritol tetranitrate.

18. A process of preparing a therapeutic composition in sustained release dosage form which comprises dissolving aluminum aspirin and polyvinyl pyrrolidone in methylene chloride, adding said solution to powdered aspirin, working the whole to a smooth, cream-like consistency, removing the solvent by evaporation, breaking the dried mass into granules, and compressing the granules into tablets, each of which contains about 90 percent of therapeutic material.

19. A method according to claim 14 in which the release time is varied by altering the ratio between the therapeutic agent and the film-forming substance; the greater the amount of film-forming substance. the longer the release time.

20. A method of preparing a sustained release therapeutic composition in the form of two-layer tablets of which each layer contains a part of a water-insoluble therapeutic agent which comprises making a first granulation of a water-insoluble therapeutic agent previously blended with a film-forming aluminum aspirin compound and a film-modifying polymer, forming a second granulation of the same water-insoluble therapeutic agent with a pharmaceutical carrier, drying each granulation and subdividing it into granules of fine mesh, and then subjecting the combined granulations to compression to form two-layer tablets in which the total quantity of therapeutic agent amounts to at least about 60 to 80 percent of the weight of the tablets.

21. A method of preparing a sustained release therapeutic composition in accordance with claim 12 in which the therapeutic agent is meprobamate and wherein the meprobamate constitutes about 80 percent of the weight of the tablets.

References Cited

UNITED STATES PATENTS

| | | | |
|---|---|---|---|
| 1,967,649 | 7/1934 | Wolf | 260—448 |
| 2,698,332 | 12/1954 | Beekman | 260—448 |
| 2,820,741 | 1/1958 | Endicott et al. | 167—82 |
| 2,959,606 | 11/1960 | Mitra et al. | 260—448 |
| 3,100,787 | 8/1963 | Staib | 260—448 |
| 3,101,293 | 8/1963 | Gaunt et al. | 167—82 |
| 3,115,441 | 12/1963 | Hermelin | 167—82 |
| 3,133,863 | 5/1964 | Tansey | 167—82 |
| 3,136,695 | 6/1964 | Tansey | 167—82 |
| 3,148,124 | 9/1964 | Gaunt | 167—82 |
| 3,155,590 | 11/1964 | Miller et al. | 167—83 |

LEWIS GOTTS, *Primary Examiner.*

S. K. ROSE, *Assistant Examiner.*

UNITED STATES PATENT OFFICE
CERTIFICATE OF CORRECTION

Patent No. 3,350,270  October 31, 1967

William E. Gaunt

It is hereby certified that error appears in the above numbered patent requiring correction and that the said Letters Patent should read as corrected below.

Column 6, in the third table, third column, lines 3 and 4 thereof, for "68" and "73" read -- 73 -- and -- 89 --.

Signed and sealed this 5th day of November 1968.

(SEAL)
Attest:

Edward M. Fletcher, Jr.
Attesting Officer

EDWARD J. BRENNER
Commissioner of Patents